US012687455B2

(12) United States Patent
Lai et al.

(10) Patent No.: US 12,687,455 B2
(45) Date of Patent: Jul. 21, 2026

(54) MTF DETECTION DEVICE FOR WAFER-LEVEL OPTICAL ELEMENT

(71) Applicant: SHENZHEN METALENX TECHNOLOGY CO., LTD, Shenzhen (CN)

(72) Inventors: Chengliang Lai, Shenzhen (CN); Chenglong Hao, Shenzhen (CN); Fengze Tan, Shenzhen (CN); Jian Zhu, Shenzhen (CN)

(73) Assignee: SHENZHEN METALENX TECHNOLOGY CO., LTD, Shenzhen (CN)

( * ) Notice: Subject to any disclaimer, the term of this patent is extended or adjusted under 35 U.S.C. 154(b) by 246 days.

(21) Appl. No.: 18/761,257

(22) Filed: Jul. 1, 2024

(65) Prior Publication Data

US 2025/0044188 A1 Feb. 6, 2025

(30) Foreign Application Priority Data

Aug. 4, 2023 (CN) .......................... 202322091345.X

(51) Int. Cl.
*G01M 11/02* (2006.01)
*G02B 5/00* (2006.01)

(52) U.S. Cl.
CPC ......... *G01M 11/0207* (2013.01); *G02B 5/005* (2013.01)

(58) Field of Classification Search
CPC .... G01M 11/0207; G01M 11/02; G02B 5/005
See application file for complete search history.

(56) References Cited

U.S. PATENT DOCUMENTS

2022/0164972 A1* 5/2022 Fu ...................... G02B 27/0172

FOREIGN PATENT DOCUMENTS

| CN | 212646048 | 3/2021 |
| CN | 216284228 | 4/2022 |
| CN | 110057554 | 2/2024 |

* cited by examiner

*Primary Examiner* — Tarifur R Chowdhury
*Assistant Examiner* — Akbar H. Rizvi
(74) *Attorney, Agent, or Firm* — JCIPRNET

(57) ABSTRACT

A MTF detection device for wafer-lever optical elements is provided, the MTF detection device including a luminescent source, a mobile disc, an adjustable bracket, and a detection assembly. A plurality of luminescent sources are movable along the direction of the light path. The mobile disc is set up with a placing area and the mobile disc is movable, so as to locate different locations of the placing area on the extension of the central line of the luminescent source by moving the mobile disc. The distance between the adjustable bracket and the luminescent source is adjustable, and an external processing assembly is located on a first side of the adjustable bracket. The detection assembly is installed over the adjustable bracket, and is used to receive the light emitted from the luminescent source through the sample to be detected and through the external processing assembly.

20 Claims, 3 Drawing Sheets

MTF DETECTION DEVICE FOR WAFER-LEVEL OPTICAL ELEMENT

CROSS-REFERENCE TO RELATED APPLICATIONS

This application claims the benefit of priority from Chinese Patent Application No. 202322091345.X, filed on Aug. 4, 2023. The content of the aforementioned application, including any intervening amendments thereto, is incorporated herein by reference in its entirety.

TECHNICAL FIELD

The present disclosure relates to the field of optical detection technology, in particular to a MTF detection device for wafer-level optical elements.

BACKGROUND

The MTF (Modulation transfer function) detection device in prior art is mainly used to detect conventional lens that has been assembled. The wafer-level metalens is a whole wafer of 4-inch, 6-inch, 8-inch, or 12-inch diameter with hundreds of individual metalenses, and the MTF detection device in the prior art cannot complete the detection of individual metalens on the wafer-level metalens before dicing and assembling.

SUMMARY

In order to solve the problems in the prior art, a MTF device for wafer-lever optical element detection is provided according to the embodiments of the present disclosure.

A MTF detection device for wafer-lever optical elements, where the device includes: a luminescent source, a mobile disc, an adjustable bracket, and a detection assembly;

a plurality of luminescent sources are used to emit light signals and are set sequentially along the direction of the light path, and the plurality of luminescent sources are movable along the direction of the light path;

the mobile disc is set up with a placing area and the mobile disc is movable, so as to locate different locations of the placing area on an extension of the central line of the luminescent source by moving the mobile disc;

the placing area is used to place a sample to be detected;

a distance between the adjustable bracket and the luminescent source is adjustable, and an external processing assembly is located on the first side of the adjustable bracket; and the first side of the adjustable bracket is the side that is close to the luminescent source;

the detection assembly is installed over the adjustable bracket, and is used to receive the light emitted from the luminescent source through the sample to be detected and through the external processing assembly.

In conclusion, the MTF detection device for a wafer-level optical element provided by the embodiment completes the detection for the wafer-level optical elements. The MTF detection for a wafer-level optical element has the luminescent source, the mobile disc, the adjustable bracket and the detection assembly, and the placing area is set on the adjustable bracket, and the external processing assembly is set on the placing area. The external processing assembly is capable of completing the detection for the wafer-level optical elements. Compared to the MTF detection device in the prior art that can only detect conventional lenses, the present disclosure can complete the detection of wafer-level optical elements without assembling by the external processing assembly on the adjustable bracket and solve the problem that the MTF detection device in the prior art cannot detect the wafer-level metalens without assembling. At the same time, each metalens matches with the external processing assembly by moving the mobile disc, to achieve the detection of each metalens on the wafer-level metalens. In addition, after detection, the wafer-level metalens can be diced and then selected to assemble, so that the optical performance and the production yield of the metalens can be improved.

In order to make the above purposes, features and advantages of the disclosure more obvious and understandable, an embodiment is described below and illustrated in detail with the attached drawings.

BRIEF DESCRIPTION OF THE DRAWINGS

The present disclosure may be better understood by reference to the description given below in combination with the drawings, where the same or similar drawing markings are used in all the drawings to represent the same or similar assemblies. The drawings are included in the specification along with the following detailed description and form part of the specification, and to further illustrate the preferred embodiments of the disclosure and explain the principles and advantages of the disclosure.

DETAILED DESCRIPTION OF THE EMBODIMENTS

Figure 1:
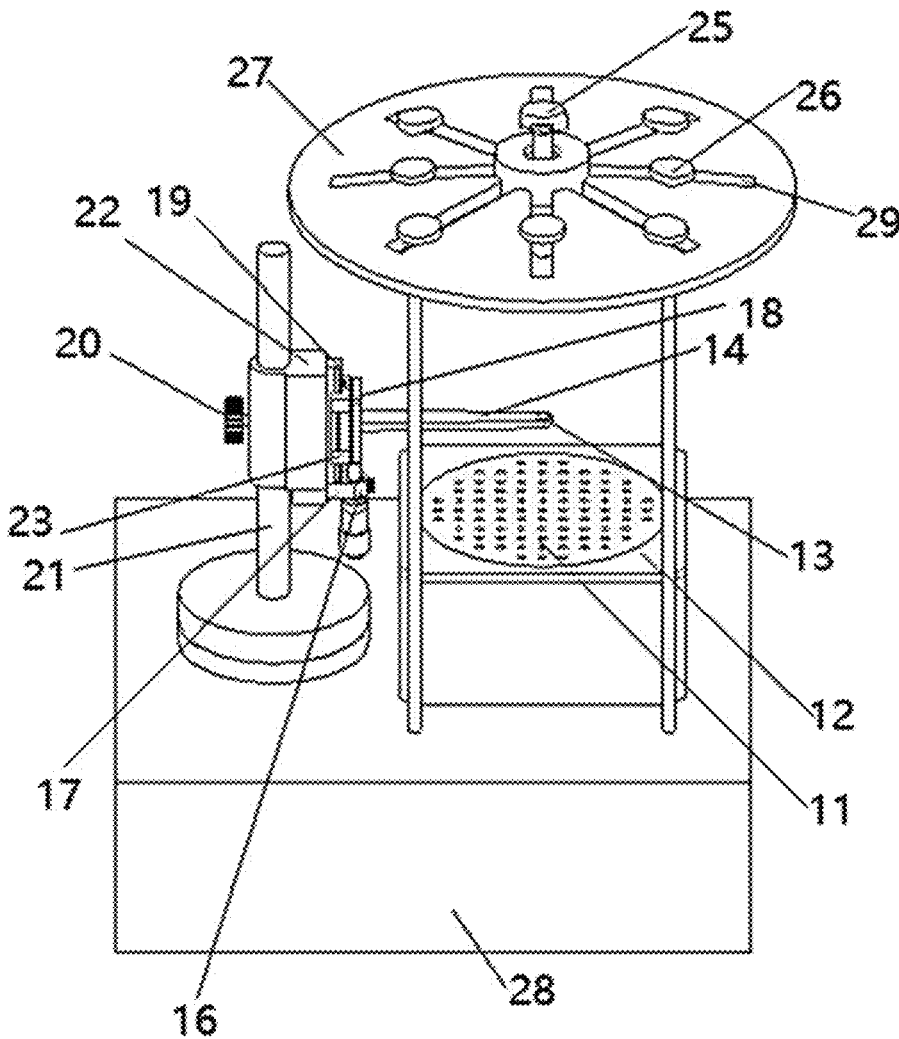
FIG. 1 shows a top view of a MTF detection device for wafer-level optical element provided by the embodiment of the present disclosure.

In order to better understand the above technical scheme, the above technical scheme will be explained in detail below in combination with the attached drawings of the instruction manual and the specific embodiment.

In the description of the present utility model, it needs to be understood that the terms "center", "longitudinal", "transverse", "length", "width", "thickness", "left", "right", "vertical", "level", "top", "bottom", "inside", "outside", "clockwise", "clockwise", "counterclockwise" indicate the bearing or position relationship based on the orientation or position relationship shown in the drawings, only to facilitate the description of the disclosure and to simplify the description, rather than indicating or implying that the device or element must have a specific orientation, be constructed and operate in a specific orientation. Therefore, it cannot be understood as a limitation to the disclosure.

In addition, the terms of "first", "second" are used only for descriptive purposes, and can not be understood as indicating or implying the relative importance or implicitly indicating the number of technical features indicated. Thus, the features defining the first or second may explicitly or implicitly include one or more features. In the description of the disclosure, the meaning of "multiple" is two or more, unless otherwise specified.

In the disclosure, unless it is specified and defined, the terms "installed", "connected", "connected", "connected" and "fixed" should be generally understood, for example, as either fixed or removable, mechanically or electrically, or indirectly through an intermediate medium, or the internal connection of two elements. For those skilled in the art, the specific meaning of the above terms in the disclosure can be understood according to specific circumstances.

The MTF detection device is used for the optical detection of assembled lens, which usually include conventional lenses and optical elements (e.g., an aperture). And wafer-level metalens is a whole wafer with multiple separate metalenses. If using the MTF detection device in prior art, the wafer-level metalens need to be diced into individual metalens and each metalens assembled into a complete camera lens, which will waste the assembly time and cost for the unqualified metalens, and reduce the detection efficiency. At the same time, it also does not conform to the shipment of integrating each metalens to the whole blue film. If the optical element is not installed on each metalens on the wafer, the MTF detection in prior art cannot be achieved due to the lack of optical elements. Therefore, we need a MTF detection device for wafer-level metalens without installing optical elements to the metalens.

Figure 2:
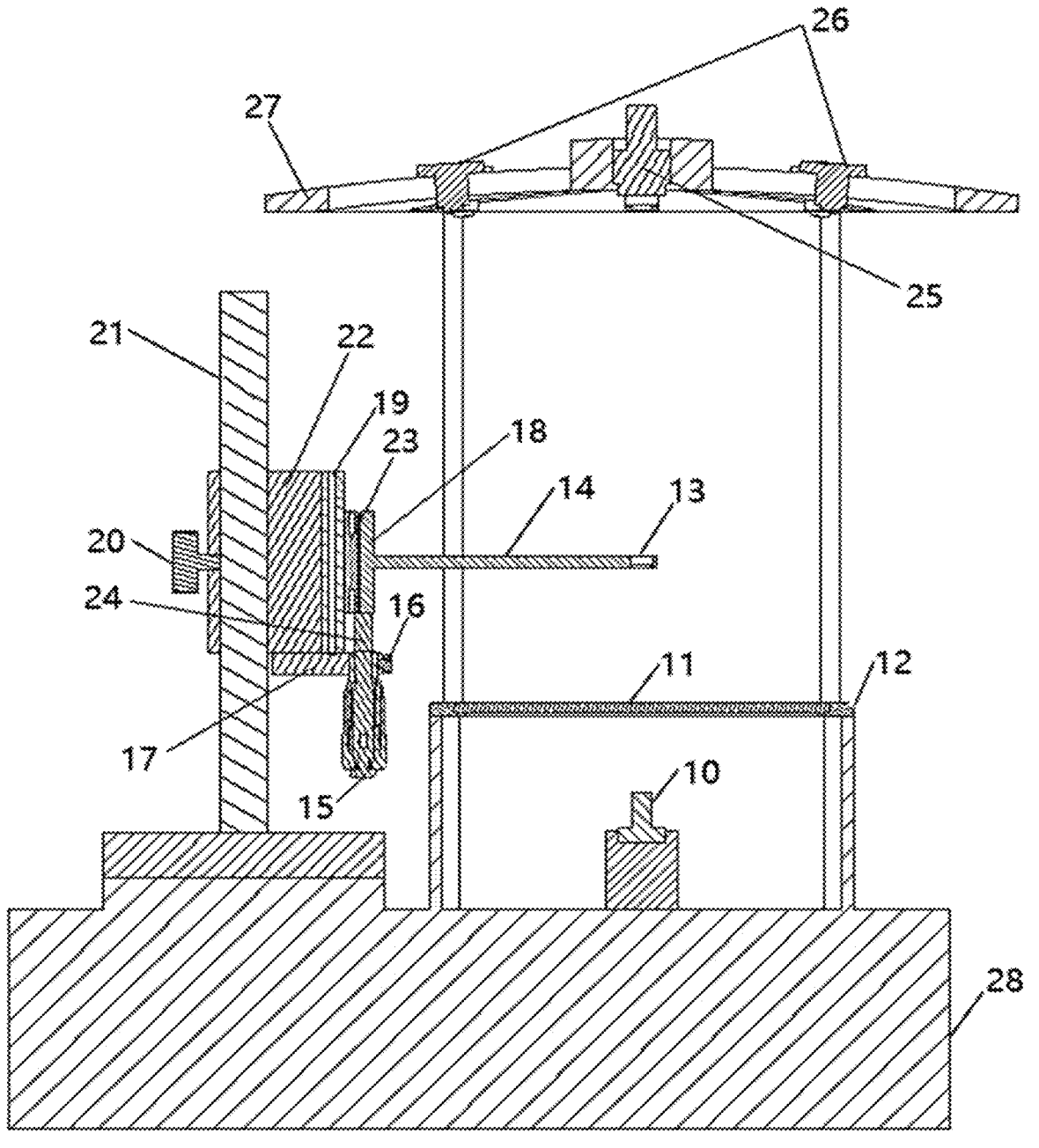
FIG. 2 shows section view of a MTF detection device for a wafer-level optical element provided by the embodiment of the present disclosure.

A top view of the MTF detection device is shown in FIG. 1. And FIG. 2 shows a section view of the MTF detection device. The MTF detection device for wafer-lever optical element is provided by the embodiment, and the device includes: a luminescent source 10, a mobile disc 12, an adjustable bracket 14, and a detection assembly; the plurality of luminescent sources 10 are used to emit light signals and are set sequentially along the direction of the light path, and the plurality of luminescent sources 10 are movable along the direction of the light path. The luminescent source 10 performs a vertical movement along the direction of the light path to move the luminescent source 10 to the image plane of the sample to be detected 11 (The image plane position of metalenses with different specifications is different). The mobile disc 12 is set up with a placing area and the mobile disc 12 is movable, so as to locate different locations of the placing area on the extension of the central line of the luminescent source 10 by moving the mobile disc 12. And the placing area is used to place a sample to be detected 11. The distance between the adjustable bracket 14 and the luminescent source 10 is adjustable, and an external processing assembly is located on a first side of the adjustable bracket 14; and the first side of the adjustable bracket 14 is the side that is close to the luminescent source 10. The detection assembly is installed over the adjustable bracket 14, and is used to receive the light emitted from the luminescent source 10 through the sample to be detected 11 and through the external processing assembly. In one embodiment, the luminescent source 10 performs a vertical movement along the direction of the light path to move the luminescent source 10 to the image plane of the different specifications of the sample to be detected. It should be noted that the lifting mechanism below the luminescent source 10 includes a linear mechanism or a pneumatic lift mechanism, but is not limited to this.

As long as the lifting mechanism in the prior art can realize the vertical movement of the luminescent source 10, the lifting mechanism can be used in the present disclosure. Therefore, the lifting mechanism in the present disclosure is not limited to the above embodiment.

In one embodiment, the sample to be detected may be a wafer-level optical element, and the wafer-level optical element may be a wafer-level metalens. Optionally, the wafer-level metalens may be a wafer-level micro-nano grating structure. In one embodiment, the placing area may be a groove 13 of the external processing element.

In one embodiment, the MTF detection device may include a base 28, the luminescent source 10, the mobile disc 12, the adjustable bracket 14 and the detection assembly. The horizontal movement of mobile disc 12 may be controlled manually, or the horizontal movement may be controlled through the stepping motor and the synchronous belt. The stepping motor can control the mobile disc 12 to move in direction of the x-axis and y-axis. The movement method through the stepping motor and the synchronous belt is an available technology. Therefore, it is not repeated here. The external processing element includes: a groove 13 and an optical assembly 31. And the optical assembly may be an aperture assembly, wherein the aperture assembly includes an aperture element and a lens.

Figure 3:
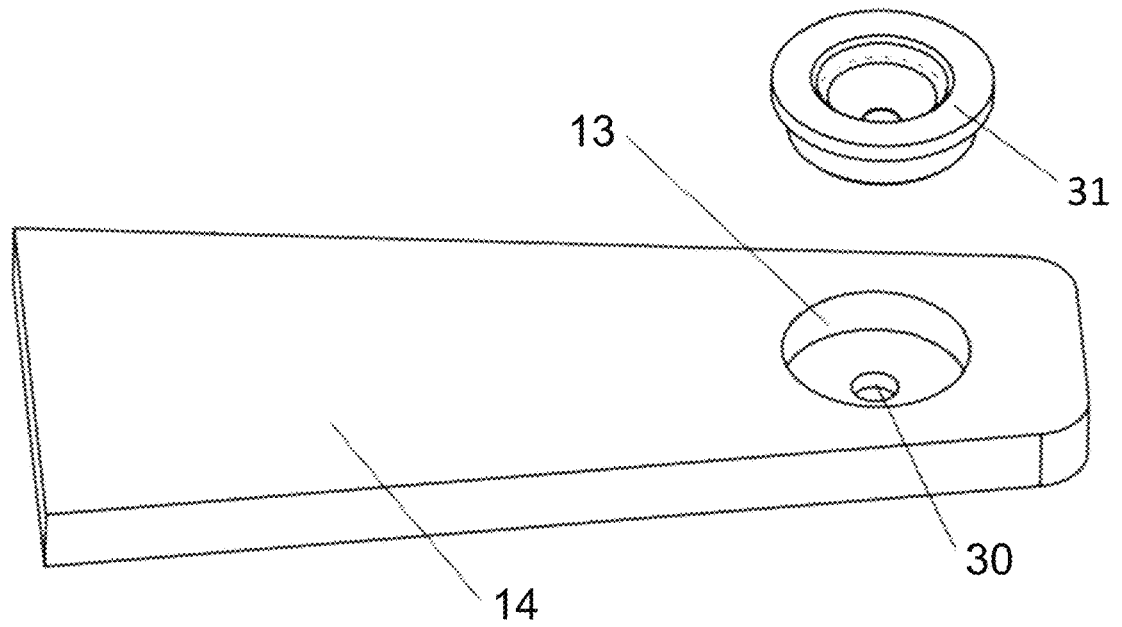
FIG. 3 shows a structural diagram of adjustable bracket, placing area and external processing assembly of a MTF detection device for a wafer-level optical element provided by the embodiment of the present disclosure.

A structural diagram of the adjustable bracket, a placing area and an external processing assembly of a MTF detection device for a wafer-level optical element provided by the embodiment of the present disclosure is shown in FIG. 3. The groove 13 is used to place the optical element 31. The bottom of the groove 13 has a hole, and the hole is used for the light to pass through. The hole is coaxially set with the luminescent source 10 all the time. Optical elements 31 with different specifications may match different-sized grooves 13. In one embodiment, although the larger groove 13 may also be occupied by the optical element 31, the luminescent source 10 cannot accurately pass through the optical element 31 because the optical element 31 may easily deviate from the hole 30 at the bottom of the groove 13.

Further, a lift mechanism is set on the one end of the adjustable bracket 14 that is away from the external processing assembly. The lift mechanism includes: a first lift structure, a second lift structure, and a lift element 22. The first lift structure is used to control a larger vertical movement of the lift element 22. The second lift structure is used to control a smaller vertical movement of the lift element 22 on the adjustable bracket 14. Optionally, the second lift structure is controlled manually. Optionally, the first lift structure may include a fixed bracket 21 and a lock assembly, and the first lift structure adjusts the lock assembly to control the vertical movement of the lift element 22 on the fixed bracket 21. The second lift structure may include a fine-tuning assembly, and the fine-tuning assembly controls the vertical movement of the lift element on the adjustable bracket 14. In one embodiment, the fixed bracket 21 and the base 28 are in a fixed connection, and the lift element 22 is socketing to the fixed bracket 21. The fine-tuning assembly is installed on one end of the lift element 22 that is away from the adjustable bracket 14. The lock assembly is used to make the lift element 22 and the adjustable bracket 14 perform simultaneous vertical movement when the lock assembly is open, and is used to lock the lift element 22 and the adjustable bracket 14 together to form a fixation when the lock assembly is closed. The fixed bracket 21 and the base 28 are in a fixed connection. The fine-tuning assembly is installed on the lift element 22, and the fine-tuning assembly is used to adjust the adjustable bracket 14. The distance between the adjustable bracket 14 and the base 28 may be controlled by the fine-tuning assembly.

In one embodiment, the fixed bracket 21 is set vertically, and is disposed on one side of the base 28. Optionally, a fixed platform may be set between the fixed bracket 21 and the base 28. The adjustable bracket 14 and the lift element 22 are in a sliding connection, and the adjustable bracket 14 and the lift element 22 are in a detachable connection. When the adjustable bracket 14 slides upwards till the adjustable bracket 14 detaches from the lift element 22, the separation between the adjustable bracket 14 and the lift element 22 completes. The size of the groove 13 is adjustable. The adjustable bracket 14 may match different aperture assemblies by changing the different-sized groove 13. The aperture assembly of different specifications can detect the metalens with different specifications, so the aperture assembly can be replaced according to the detection requirements.

In one embodiment, in order to control a smaller vertical movement of the lift element 22 on the adjustable bracket 14, the fine-tuning assembly may include: a differential head 15, an expansion rod 24, a sliding block 23, a side plate 18 and a guide rail 19. The guide rail 19 is located on one side of the lift element 22 that is close to the adjustable bracket 14. The adjustable bracket 14 is fixed on the side plate 18, and the side plate 18 is installed on one side of the sliding block 23 that is away from the guide rail 19. One end of the expansion rod 24 is connected to the differential head 15, and the other end of the expansion rod 24 is connected to the sliding block 23. When the differential head 15 is used to shorten the expansion rod 24, the expansion rod 24 shortens and moves the sliding block 23 towards the differential head 15, and the adjustable bracket 14 performs the downward movement with the sliding block 23 simultaneously. When the differential head 15 is used to lengthen the expansion rod 24, the expansion rod 24 lengthens and moves the sliding block 23 away from the differential head 15, and the adjustable bracket 14 performs an upwards movement with the sliding block 23 simultaneously. Particularly, the expansion rod 24 and the sliding block 23 are in a plug-in connection or a magnetic connection. The differential head 15 is connected to the lift element 22 by the fixed assembly; the fixed assembly includes a ring element 16 and a support rod 17. The differential head 15 passes through the ring element 16 and connects to the expansion rod 24. One end of the support rod 17 is connected to the ring element 16, and the other end of the support rod 17 is fixedly connected to the lift element 22.

Figure 4:
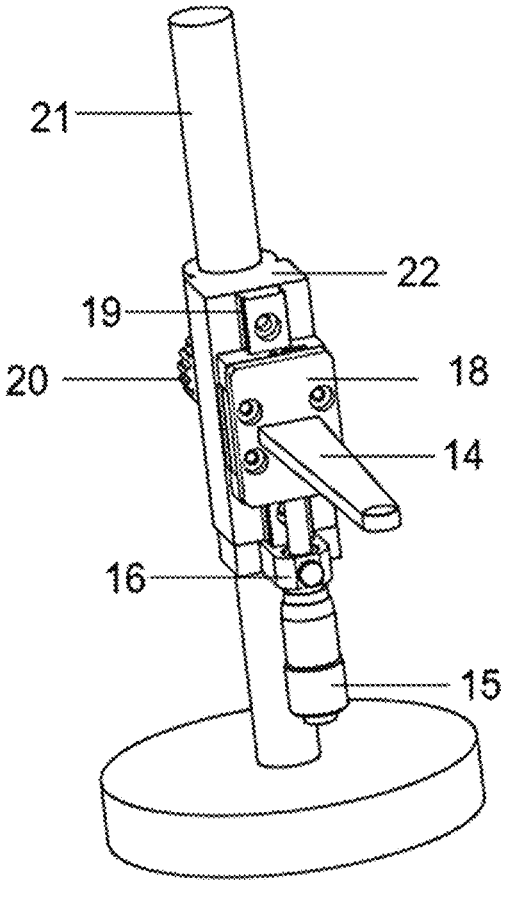
FIG. 4 shows a structural diagram of a sliding block, a guide trail and a differential head of a MTF detection device for a wafer-level optical element provided by the embodiment of the present disclosure.

In one embodiment, according to a structural diagram of a sliding block, a guide trail and a differential head of a MTF detection device for a wafer-level optical element in FIG. 4, the guide rail 19 may be a heteromorphic structure. Accordingly, the sliding block 23 is socketing to the guide rail 19, and the guide rail 19 is set up with a heteromorphic groove. The shape of the heteromorphic groove matches the shape of the guide rail 19. It should be noted that the shape of the guide rail 19 and the shape of the heteromorphic groove matching the guide rail 19 on the slide block 23 may be arbitrary as long as the guide rail 19 and the sliding block 23 will not separate. There is no limitation here.

In one embodiment, the sliding block 23 and the guide rail 19 may be separated, so as to change the sliding block 23 and the adjustable bracket 14. The adjustable bracket 14 is in a detachable connection with the sliding block 23. The size of the groove 13 may be changed by changing the adjustable bracket 14, so as to make the groove 13 match with the aperture assemblies with different specifications.

In one embodiment, the size of the groove 13 in the adjustable bracket 14 may be replaced with a larger size groove 13, so as to match with the aperture assemblies with different specifications. And the aperture assemblies may be located at the center of the groove 13.

Further, the lock assembly include a fixed valve 20 and a threaded hole. The lift element 22 is set up with the threaded hole. The fixed valve 20 passes through the thread hole to clamp the fixed bracket 21, so as to fix the lift element 22 on the fixed bracket 21. The fixed valve 20 is used to deactivate the clamp status between the fixed valve 20 and the fixed bracket 21 by rotating the fixed valve 20, so as to open the lock assembly and make the lift element 22 to perform vertical movement on the fixed bracket 21.

In one embodiment, the fixed valve 20 may be a bolt, and the lift element 22 may be socketing to the fixed bracket 21. The fixed valve 20 and the fixed bracket 21 may be clamped by the threaded connection, so as to locate the position of the lift element 22 on the fixed bracket 21. The lift element 22 and the fixed bracket 21 are not limited to the above fixation methods, and other fixation method may be selected, which will not be repeated here.

Furthermore, the detection assembly may include a first detector 25. The first detector 25 and the luminescent source 10 are located along the direction of the light path, and the first detector 25 is fixed over the luminescent source 10. The first detector is used to receive the light signal emitted by the center of the luminescent source.

In one embodiment, the detection assembly may include a second detector 26. The first detector 25 and the plurality of the second detectors 26 are located at different positions. The second detector is used to receive the light signal emitted by anon-center of the luminescent source.

In one embodiment, the detection assembly may include a second detector 26, a dome bracket 27, and a plurality of chutes 29. In one embodiment, the first detector 25 is fixed at the center of the dome bracket 29. Each of the chutes 29 in the plurality of the chutes 29 is disposed on the dome bracket 27, one end of each chute 29 is disposed at the center of the dome bracket 27, and the direction of the chutes 29 extends from the center of the dome bracket 29 to the direction that is away from the center of the dome bracket 29. Each of the second detectors 26 is installed in each chute 29, respectively. The light signal emitted by the luminescent source 10 passes through the sample to be detected 11 and through the external processing assembly, then is received by the detection assembly. In one embodiment, the light signal is received by the first detector 25 and the second detector 26. In one embodiment, the light signal is received by the first detector 25.

In one embodiment, the first detector 25 and the second detector 26 may be an optical instrument that can catch the light signal emitted by the luminescent source 10. The luminescent source 10 is set on the base 28, and the light signal emitted by the center of the luminescent source 10 passes through the mobile disc 12 and the groove 13 sequentially and be received by the first detector 25. The second detector 26 is used to receive the light signal emitted by the non-center of the luminescent source 10.

In conclusion, the MTF detection device for a wafer-level optical element provided by the embodiment completes the detection for the wafer-level optical elements. The MTF detection for a wafer-level optical element has the luminescent source, the mobile disc, the adjustable bracket and the detection assembly, the placing area is set on the adjustable bracket, and the external processing assembly is set on the placing area. The external processing assembly is capable of completing the detection for the wafer-level optical elements. Compared to the MTF detection device in the prior art that can only detect conventional lenses, the present disclosure can complete the detection of wafer-level optical elements, without assembling, by the external processing assembly on the adjustable bracket and solve the problem that the MTF detection device in the prior art cannot solve, i.e., detect the wafer-level metalens without assembling. At the same time, each metalens matches with the external processing assembly by moving the mobile disc, to achieve the detection of each metalens on the wafer-level metalens. In addition, after detection, the wafer-level metalens can be diced and then selected to assemble, so that the optical performance and the production yield of the metalens can be improved.

The above is only a specific embodiment of the embodiments of this disclosure, but the scope of protection of the embodiment of this disclosure is not limited to this. And those skilled in the field can easily think of any change or substitution for this disclosure, which should be covered within the protection scope of this disclosure. Therefore, the scope of the protection of the present disclosure shall be the scope of the claims.

What is claimed is:

1. A MTF detection device for a wafer-level optical element, wherein the device comprises:
   a luminescent source, a mobile disc, an adjustable bracket, and a detection assembly;
   a plurality of luminescent sources is used to emit light signals and are set sequentially along a direction of a light path, and the plurality of luminescent sources are movable along the direction of the light path;
   the mobile disc is set up with a placing area, and the mobile disc is movable, so as to locate different locations of the placing area on an extension of a central line of the luminescent source by moving the mobile disc;
   the placing area is used to place a sample to be detected;
   a distance between the adjustable bracket and the luminescent a source is adjustable, and an external processing assembly is located on a first side of the adjustable bracket; and the first side of the adjustable bracket is a side that is close to the luminescent source; and
   the detection assembly is installed over the adjustable bracket, and is used to receive the light emitted from the luminescent source through the sample to be detected and through the external processing assembly.

2. The MTF detection device according to claim 1, wherein the luminescent source performs a vertical movement along the direction of the light path to move the luminescent source to an image plane of the sample to be detected.

3. The MTF detection device according to claim 1, wherein the external processing assembly comprises: a groove and an optical assembly.

4. The MTF detection device according to claim 1, wherein the optical element comprises: an aperture assembly; wherein
   the aperture assembly comprises an aperture element and a lens;
   the bottom of the groove has a hole, and the hole is used for the light to pass through; and
   the hole is coaxially set with the luminescent source all the time.

5. The MTF detection device according to claim 4, wherein a size of the groove is adjustable; and
   the aperture assembly is located at a center of the groove.

6. The MTF detection device according to claim 1, wherein a lift mechanism is set on the one end of the adjustable bracket that is away from the external processing assembly; wherein the lift mechanism comprises: a first lift structure, a second lift structure, and a lift element;
   the first lift structure is used to control a larger vertical movement of the lift element; and
   the second lift structure is used to control a smaller vertical movement of the adjustable bracket on the lift element.

7. The MTF detection device according to claim 6, wherein the first lift structure comprises a fixed bracket and a lock assembly;
   the first lift structure adjusts the lock assembly to control the vertical movement of the lift element on the fixed bracket;
   the second lift structure comprises a fine-tuning assembly; and
   the second lift structure controls the vertical movement of the adjustable bracket on the lift element.

8. The MTF detection device according to claim 7, wherein the fixed bracket and a base are in a fixed connection;
   the lift element is socketing to the fixed bracket;
   the fine-tuning assembly is installed on one end of the lift element that is away from the adjustable bracket;
   the lock assembly is used to make the lift element and the adjustable bracket perform simultaneous vertical movement when the lock assembly is open; and
   the lock assembly is used to lock the lift element and the adjustable bracket together to form a fixation when the lock assembly is closed.

9. The MTF detection device according to claim 8, wherein the fine-tuning assembly comprises: a differential head, an expansion rod, a sliding block, a side plate and a guide rail;
   the guide rail is located on one side of the lift element that is close to the adjustable bracket;
   the adjustable bracket is fixed on the side plate, and the side plate is installed on one side of the sliding block that is away from the guide rail;
   one end of the expansion rod is connected to the differential head, and the other end of the expansion rod is connected to the sliding block;
   when the differential head is used to shorten the expansion rod, the expansion rod shortens and moves the sliding block toward the differential head, and the adjustable bracket performs the downward movement with the sliding block simultaneously; and
   when the differential head is used to lengthen the expansion rod, the expansion rod lengthens and moves the sliding block away from the differential head, and the adjustable bracket performs the upward movement with the sliding block simultaneously.

10. The MTF detection device according to claim 8, wherein the guide rail and the sliding block are in a detachable connection, and the sliding block and the adjustable bracket are in a detachable connection.

11. The MTF detection device according to claim 9, wherein the expansion rod and the sliding block are in a plug-in connection.

12. The MTF detection device according to claim 1, wherein the detection assembly comprises: a first detector;
   the first detector and the luminescent source are located along the direction of the light path, and the first detector is fixed over the luminescent source; and
   the first detector is used to receive the light signal emitted by the center of the luminescent source.

13. The MTF detection device according to claim 12, wherein the detection assembly comprises: a plurality of second detectors;

the first detector and the plurality of the second detectors are located at different positions; and the second detector is used to receive the light signal emitted by a non-center of the luminescent source.

14. The MTF detection device according to claim 13, wherein the detection assembly comprises: a dome bracket, and a plurality of chutes;

the first detector is fixed at the center of the dome bracket;

each of the chutes in the plurality of the chutes is disposed on the dome bracket, one end of each chutes is disposed at the center of the dome bracket, and the direction of the chutes extends from the center of the dome bracket to the direction that is away from the center of the dome bracket;

each of the second detector is installed in each chute, respectively; and the light signal emitted by the luminescent source passes through the sample to be detected and through the external processing assembly, then is received by the detection assembly.

15. The MTF detection device according to claim 7, wherein the lock assembly comprises a fixed valve and a threaded hole;

the life element is set with the threaded hole;

the fixed valve is through the thread hole to clamp the fixed bracket, so as to fix the lift element on the fixed bracket; and the fixed valve is used to deactivate the clamp status between the fixed valve and the fixed bracket by rotating the fixed valve, so as to open the lock assembly and make the lift element to perform vertical movement on the fixed bracket.

16. The MTF detection device according to claim 10, wherein the differential head is connected to the lift element by the fixed assembly;

the fixed assembly comprises a ring element and a support rod;

the differential head passes through the ring element and connects to the expansion rod; and one end of the support rod is connected to the ring element, and the other end of the support rod is fixedly connected to the lift element.

17. The MTF detection device according to claim 1, wherein the sample to be detected is a wafer-level optical element.

18. The MTF detection device according to claim 17, wherein the sample to be detected is a wafer-level metalens.

19. The MTF detection device according to claim 18, wherein the sample to be detected is a wafer-level micro-nano grating structure.

20. The MTF detection device according to claim 1, wherein the luminescent source is set coaxially with the external processing assembly, so as to make the light signal emitted by the luminescent source pass through the sample to be detected and through the external processing assembly, and then be received by the detector to complete the MTF detection of the sample to be detected.

* * * * *